United States Patent [19]
Timbs

[11] 3,934,492
[45] Jan. 27, 1976

[54] VARIABLE SPEED DRIVE FOR BICYCLES AND THE LIKE

[76] Inventor: Norman E. Timbs, 10421 Beckford Ave., Northridge, Calif. 91324

[22] Filed: Mar. 17, 1975

[21] Appl. No.: 558,673

Related U.S. Application Data

[63] Continuation of Ser. No. 428,029, Dec. 26, 1973, abandoned.

[52] U.S. Cl.................... 74/740; 74/689; 74/750 B
[51] Int. Cl.².......................................... F16H 37/06
[58] Field of Search.......... 74/750 B, 689, 690, 691, 74/681, 686, 687, 688, 740

[56] References Cited
UNITED STATES PATENTS

| | | |
|---|---|---|
| 598,762 | 2/1898 | Behrens ................................ 74/690 |
| 1,185,546 | 5/1916 | Rodgers ................................ 74/689 |
| 2,422,343 | 6/1947 | Duer .................................... 74/724 X |
| 2,931,250 | 4/1960 | Ebert .................................... 74/687 |
| 3,298,174 | 1/1967 | Stoyke et al. ........................ 74/687 |

Primary Examiner—Benjamin W. Wyche
Assistant Examiner—John Reep

[57] ABSTRACT

A variable speed "stiff-hub" drive adapted particularly to bicycles and comprised of a constant mesh infinitely variable gearing with an integral input crank shaft projecting axially from opposite ends of an enclosing case, with a drive sprocket at one side of the case and coaxially disposed over one of said crank shaft ends, and having a control means which operates in conjunction with a single lever which also comprises the braking force actuator.

11 Claims, 8 Drawing Figures

STAGE I

STAGE II

VARIABLE SPEED DRIVE FOR BICYCLES AND THE LIKE

This is a continuation of application Ser. No. 428,029, filed Dec. 26, 1973, entitled Vehicle Transmission and Brake now abandoned.

BACKGROUND

It is a general object of this invention to provide vehicular transportation capable of moving varied loads at varied speeds and under varied conditions, utilizing a prime mover having capabilities that require mechanical advantage, particularly when human powers are relied upon. Although the concepts herein disclosed are applicable to engine or motor powered vehicles and/or like devices, it is the human powered vehicle and/or device such as a bicycle in which this invention is advantageously embodied as hereinafter disclosed. Working pressure available from human power is substantial while continued muscular effort through the movement of human limbs is limited, and therefore efficient mechanical advantage is much to be desired, and it is to these ends that I have provided this improved and cooperatively related vehicle, transmission and braking.

Referring to the motivating power necessary to accelerate and to propel bicycles and the like, especially human powered vehicles, a multi-speed transmission is commonly employed, but limited to certain spaced gear ratios. Derailleur chain and sprocket gearing is commonly employed, and there are geared hubs, for implementing speed ratio changes between the foot pedal operated crank and the supporting drive wheel. The commonly accepted type of gear changer is the Derailleur type, with its speed ratio limitations and complexities which not only encumber the vehicle but which are vulnerable to damage. Therefore, it is an object of this invention to eliminate gear ratio limitations and to provide infinitely variable gear ratios within the range required. With the present invention, a variable ratio transmission is provided for changing the angular velocity from an input shaft to an output shaft; and in the particular case illustrated, to increase angular velocity from a bicycle crank shaft to a drive sprocket that rotates a drive wheel (the rear wheel).

Variable ratio transmissions of the prior art have not been positive, and in one way or another rely upon frictional engagement between the drive and driven members; reference being made to cone or V-belt pulley drives, disc and roller drives. Also, variable ratio transmissions exist in the form of both hydraulic and electric apparatus wherein current flow is controlling, but not absolutely positive in every application. On the contrary, meshed gear engagement is positive and it is therefore an object of this invention to provide positive in-mesh infinitely variable ratio transmission of rotative power having the advantages of direct and positive gear engagement between an input shaft and an output shaft. With the present invention, there is a constant mesh ratio changer and variable speed feedback to an element thereof adding to or subtracting from the output velocity, and in the preferred embodiment there are first and second stages of gearing and there is a variable speed feedback into one stage to add or substract angular velocity as may be required. A feature of the transmission is the feedback through non-reversible gearing which substantially reduces the torque requirement of the infinitely variable speed control means that governs the input-output speed ratio.

Transmissions involving gears and controls therefor are most often weighty and space consuming, it being an object of this invention to provide a variable ratio transmission of the character thus far referred to that is small and compact, and consequently of relatively light weight. The bicycle, for which the embodiment herein disclosed is designed, is a light weight competition cycle, in which case the input torque on the crank shaft is quite high. Therefore, it is also an object to provide a durable gearing that will withstand any and all mechanical pressures likely to be imposed thereon. In practice, the first and second gearing stages are of the planetary type with multiple pinions having wide faced toothed engagement, while the speed regulating control means includes a non-reversible worm and wheel feedback drive into the second stage gearing operating at lower torque value than the first stage gearing. Anti-friction bearings are used exclusively in the journaling of all torque transmitting and/or higher velocity elements.

The independent controllability of prior art bicycle transmissions and braking has involved separate manual controls, the former requiring selective positioning and the latter requiring forceful actuation. It is an object of this invention to combine the independent controllability of these two control functions into one control means by which both selective positioning and forceful actuation are manually applied. As will be described, the controlling means comprises a lever having distinct modes of actuation, one whereby it is rotatively positioned to effect selectivity of the variable output ratio of the transmission hereinabove referred to, and one whereby it is forcibly displaced to effect actuation of the brake.

The usual hanger assembly of the conventional bicycle is replaced in the present invention, it being an object to provide a frame adapted to accept the transmission of the character hereinabove referred to. In practice, the said transmission and its control means are combined in a casing adapted to be disassembled for accessibility, and for removal and replacement.

DRAWINGS

The various objects and features of this invention will be fully understood from the following detailed description of the typical preferred form and application thereof, throughout which description reference is made to the accompanying drawings, in which.

Figures 2, 3:
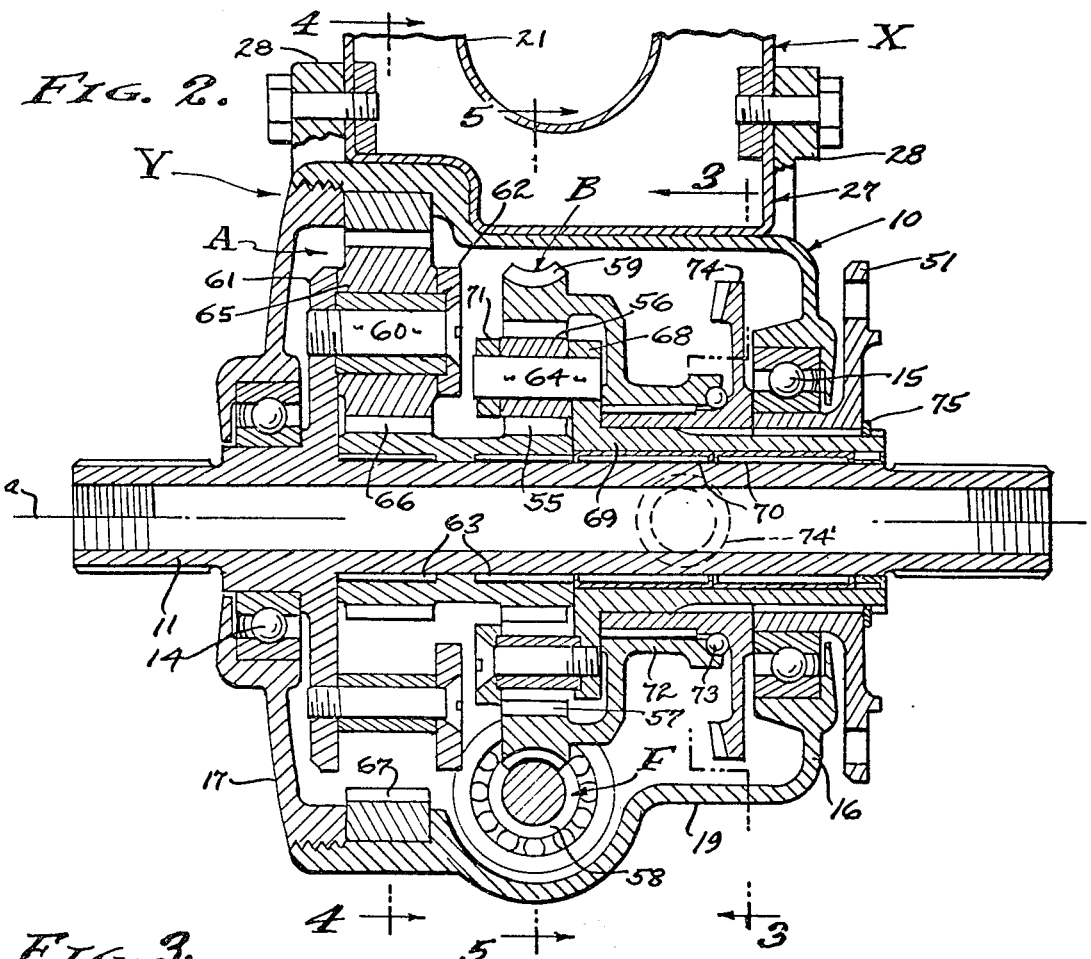
FIG. 2 is an enlarged detailed sectional view of the transmission taken as indicated by line 2—2 on FIG. 1.
Figure 4:
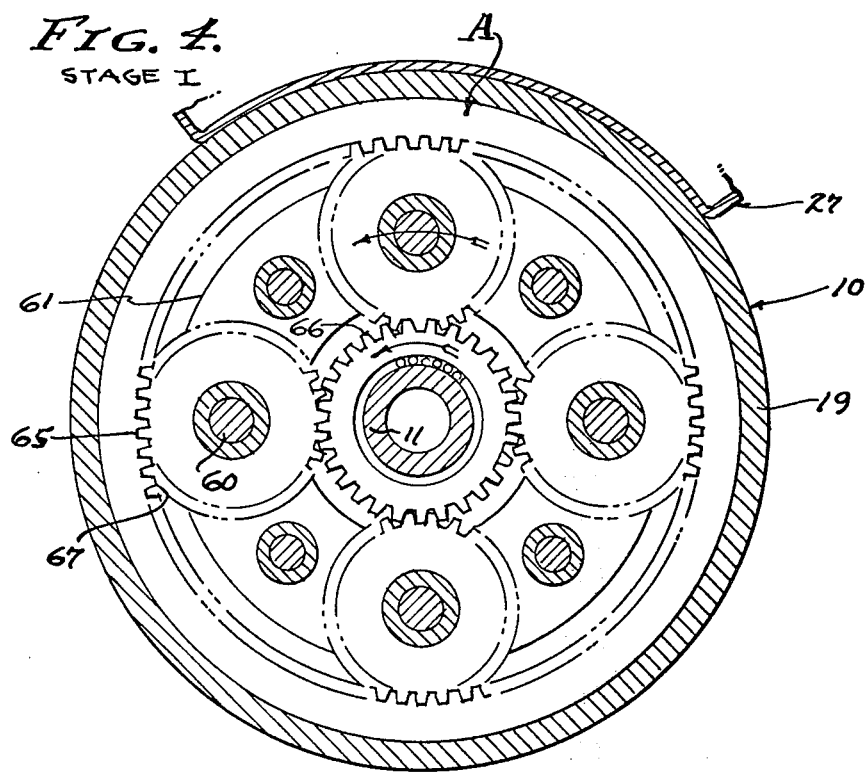
Figure 5:
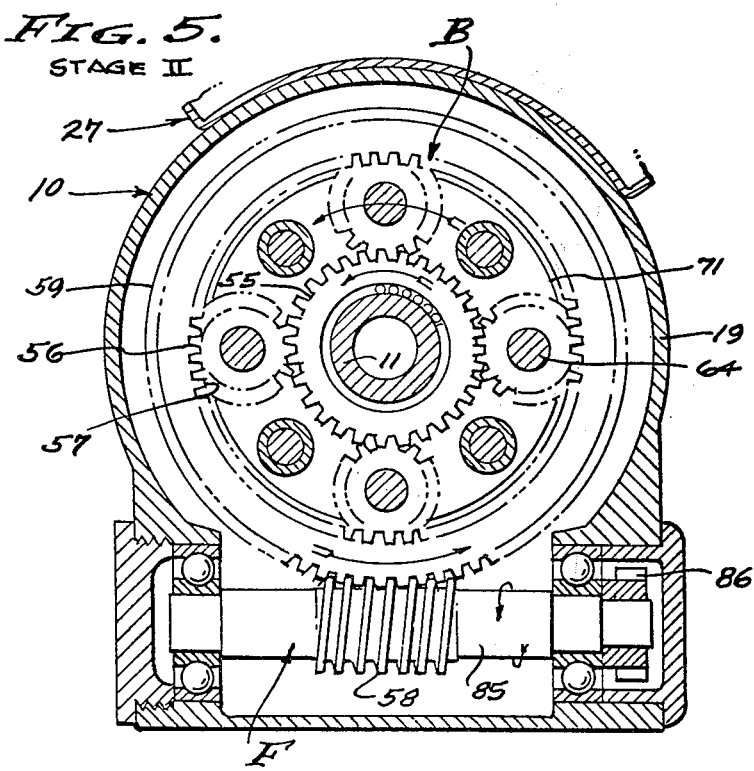

FIGS. 3, 4, and 5 are sectional views taken as indicated by lines 3—3, 4—4, and 5—5 on FIG. 2.

Figure 6:
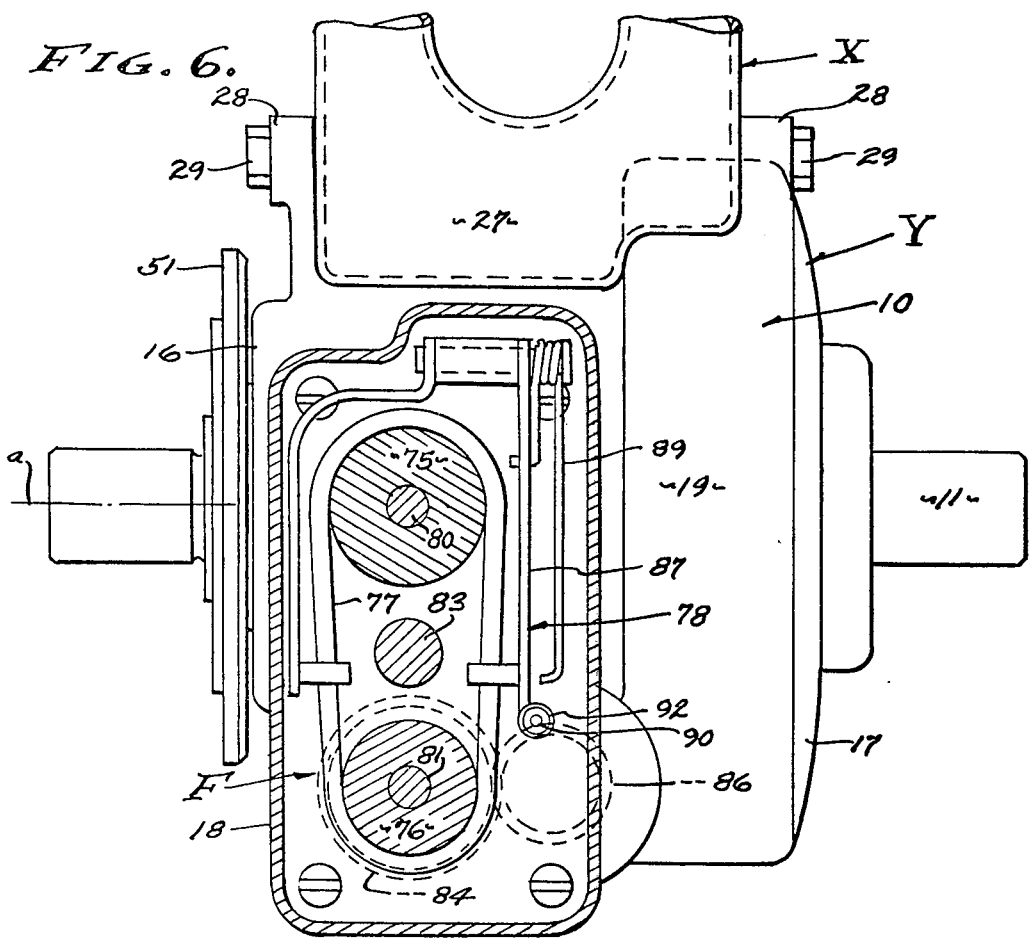

FIG. 6 is a sectional view of the variable speed feedback drive which characterizes the present invention, being a view taken as indicated by line 6—6 on FIG. 3.

Figure 1:
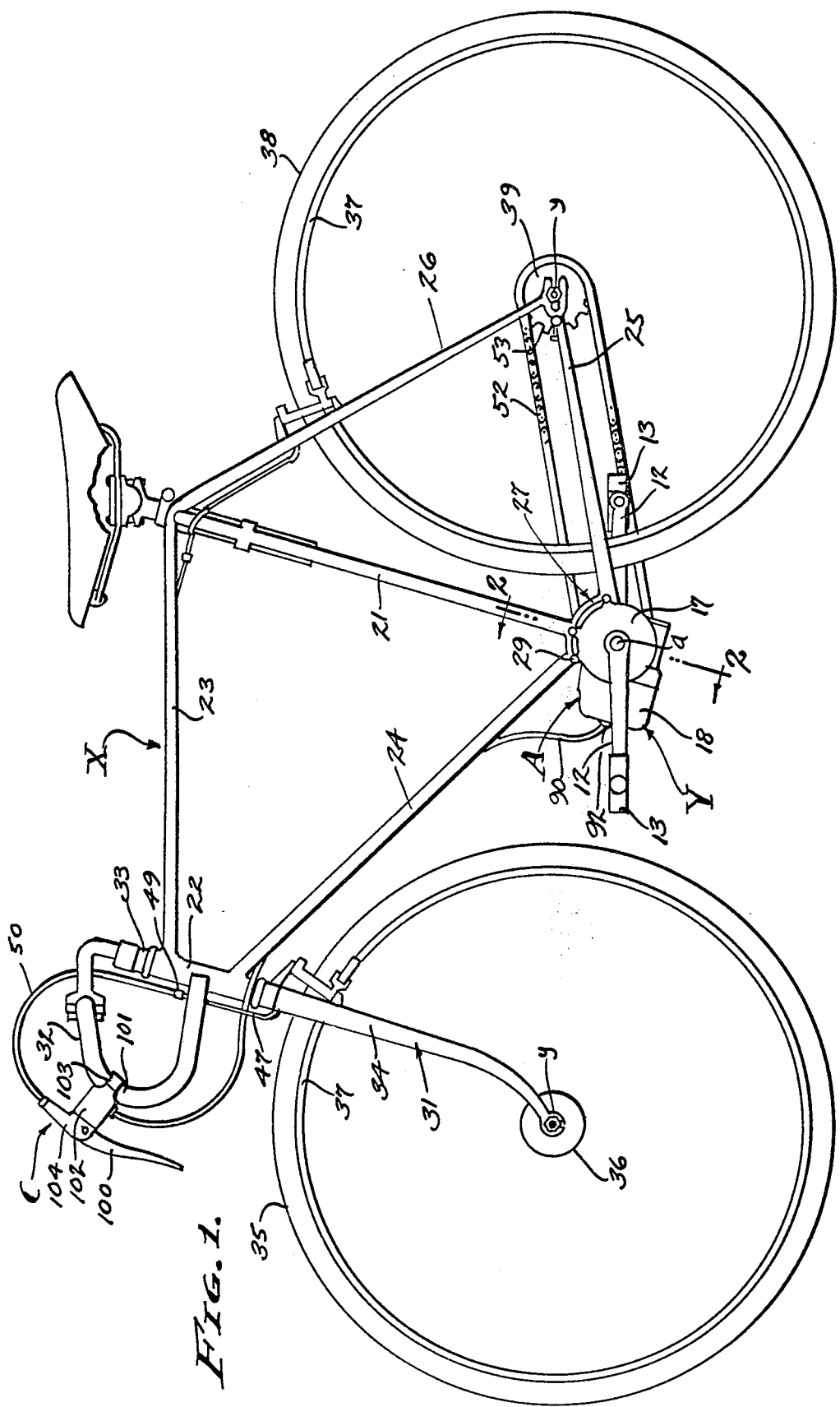
FIG. 1 is a side elevation of the vehicle transmission and brake of the present invention.
Figure 7:
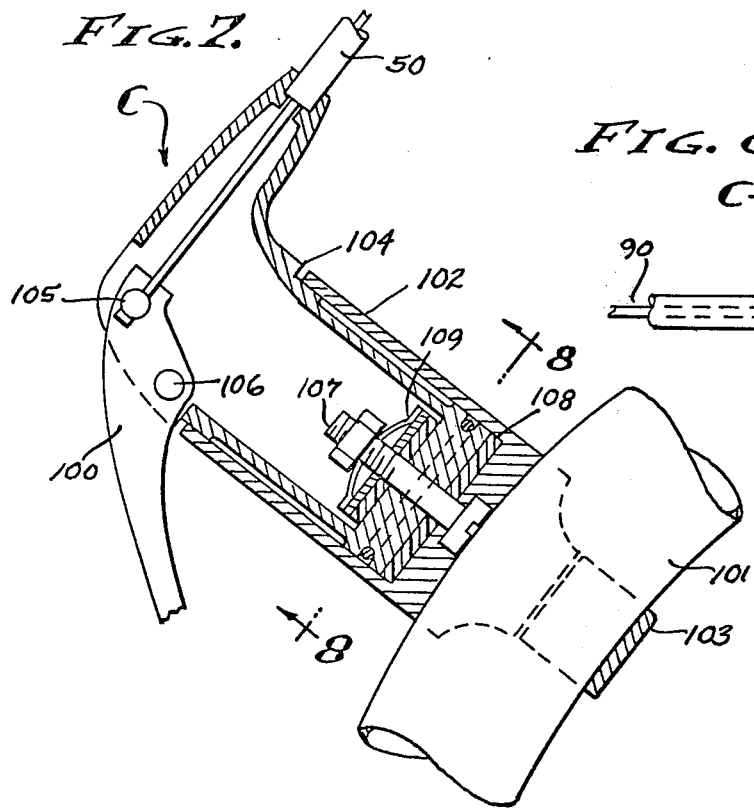

FIG. 7 is an enlarged fragmentary and sectioned view of the single control means (removed from FIG. 1) provided for braking and to condition the transmission.

Figure 8:
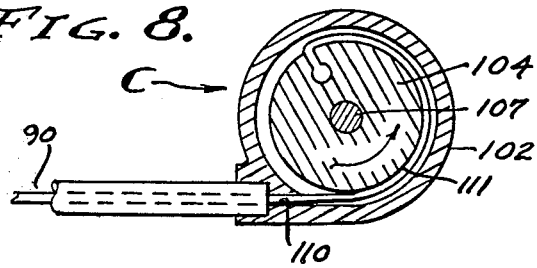

FIG. 8 is a sectional view taken as indicated by line 8—8 on FIG. 7.

PREFERRED EMBODIMENT

The present invention involves, generally, a vehicle X and transmission Y and brake concept cooperatively combined as a bicycle adapted to be powered by a rider for motivation. The prerequisites of a high performance bicycle are light weight, strength, and a wide transmission range; and it is in each of these that the present invention provides improvements. Firstly, the constant mesh infinitely variable speed transmission Y is characterized by a casing of a type and configuration unprecedented in cycle frames, and in this respect the vehicle X is provided with a frame for the replaceable combining of said transmission Y therewith. Secondly, the variable speed controllability of the transmission Y is effected by control means C that simultaneously controls the independent actuation of the brake.

TRANSMISSION-FRAME

The vehicle X involves a frame to which the case of the transmission Y is removeably and/or replaceably secured. As will be hereinafter described, the transmission Y involves several interrelated gear means and a variable speed feedback, in which case there is a sizeable gear case 10 disposed on a transverse horizontal axis on which the crank shaft 11 projects therethrough to carry a pair of diametric crank arms 12 at its opposite projecting ends. There are pedals 13 at the working ends of the arms for conventional application of force by a rider. The interior of case 10 is to accommodate the said several gear means, there being carrier bearings 14 and 15 at axially opposite ends of the case to carry the crank shaft 11 through members telescopically engaged thereover; one end of the case being permanently closed by a wall 16 and the other end by a removeable plate 17. The carrier bearings 14 and 15 are journaled in the wall 16 and plate 17 respectively. The interior of the case 10 is open radially for the accessible installation of the variable feedback, and over which there is a removeable cover 18. In practice, the variable feedback and its cover 18 are horizontally disposed to project forwardly, the cover 18 being detachably secured to the case housing 19 by means of a screw fastener 20.

In accordance with this invention, the case 10 hereinabove described is fastened into the frame of the vehicle X so that the one structurally complements the other. Although the frame type or configuration can vary, the preferred "diamond" frame is employed as shown, involving a center post 21, a head 22, upper and lower rails 23 and 24 extending between the upper and lower extremities of the post and head respectively, and convergent lower and rear forks 25 and 26 extending rearwardly from the bottom and top extremities of the center post respectively. The joinder of the bottom and lower extremities of the post 21, lower rail 24 and lower fork 25 is by means of a saddle 27 having a seat complementary to the exterior of housing 19 of the transmission case 10. In practice, the seat is an arcuate quadrant centered about the axis a of the crank shaft 11, there being widely spaced and parallel flanges 28 embracing the opposite faces of the saddle and fastened thereto by screw fasteners 29 in shear, as is clearly shown. Correspondingly, each of the frame elements 21, 24 and 25 are comprised of monocoque tubes and by joinder at the head 22 and by joinder into the saddle 27. The member which comprises the saddle 27 are of shell-form and become monocoque when secured into working position as by heli-arc welding.

CONTROL

The vehicle X involves a single control means C for governing the gear ratio of the transmission Y and for applying actuation force to the brake. As shown, the bicycle has a front fork 31 comprised of a header with an upstanding tube 33 and spaced depending tubes 34 on which the front wheel 35 is journaled upon an anti-friction hub 36. The upstanding tube 33 is journaled within the head 22 by means of spaced anti-friction bearings, the tube 33 projecting upwardly to carry a transverse handle bar 32 affixed thereto as shown. The front wheel has a tyred rim 37 that revolves forwardly beneath the header 33, and it is in this area of the bicycle structure that the front brake is installed. Also, the bicycle has the rear forks 26 on which the rear wheel 28 is journaled upon an anti-friction hub 39. The rear wheel has a tyred rim 37 that revolves forwardly within the upper extremity of forks 26, and it is in this area of the bicycle structure that the rear brake is installed.

TRANSMISSION

The single control means C for the vehicle X governs the gear ratio of the transmission Y for applying propelling force to the rear wheel 28. The transmission Y is uniquely a constant mesh infinitely variable speed transmission adapted in this instance to bicycle requirements wherein there is a high torque low velocity input and a low torque high velocity output and involves the case 10 mounted to the saddle 27 and in which the crank shaft 11 is journaled upon the bearings 14 and 15 as above described. The oppositely projecting crank shaft 11 is revolved by opposite end crank arms 12 at high torque and low velocity, and there is a drive sprocket 51 coaxially rotatable over the shaft 11 and exposed at the exterior of the case 10 to transport a chain 52 that extends to a driven sprocket 53 affixed to the hub of the rear wheel 28. The drive sprocket 51 operates at infinitely variable angular velocity and corresponding variable torque, as compared with the input shaft 11; it being understood that said shaft 11 is operable at varied speeds and with the application of different torque values.

In accordance with this invention, the transmission Y comprises a constant mesh speed changer B and a variable speed feedback means F. The speed changer B is comprised of an input gear 55, an output gear 56, and a feedback gear 57. The output gear 56 is characteristically a planet gear that cycles around the input sun gear 55 and within the feedback ring gear 57, or the equivalent gearing. The variable speed feedback F is a means that governs the angular velocity of the feedback gear 57 and is characteristically a non-reversible gear engagement and the intermeshed engagement of all gear teeth is constant, the variable speed feedback velocity being applied in relation to the output velocity and controlled so as to determine the velocity of the output gear 56. In carrying out this invention, the non-reversible gear engagement of the variable speed feedback F to the feedback gear 57 of the speed changer A is a worm and wheel engagement, wherein the worm gear 58 is operated at infinitely variable speed in governing the angular velocity of the worm wheel 59, and controlling the angular velocity of gear 57 connected therewith so that the input-output velocities are accordingly added to or subtracted from as may be required.

In accordance with this invention, the transmission Y comprises first and second stages of gearing with a consequent substantial reduction of torque requirement on the variable speed feedback F. As shown, the first stage gearing involves a speed changer A and the second stage gearing involves the speed changer B. Like the speed changer B, speed changer A is comprised of an input gear 65, an output gear 66, and a stationary ring gear 67. The input gear 65 is characteristically a planet gear that cycles around the output sun gear 66 and within the ring gear 67, or the equivalent gearing. In the case illustrated where torque reduction is to be established at the feedback gear 57, the primary ratio of gear change is obtained by step-up gearing in stage A and step-down gearing in stage B. For example, the ring gear 67 is three diameters of the output gear 66, in which case the step-up ratio is 4 to 1 with a corresponding reduction in torque; while the ring gear 57 is two diameters of input gear 55, in which case the step-down ratio is 3 to 1 with a correspondingly further reduction in torque and with the result that reduced force is required to control the angular velocity of the worm wheel 59 which drives the same at varied speeds. The 4 to 1 velocity increase will be divided by three when the ring gear 57 is stationary.

However, when the ring gear 57 is revolved with and at a velocity equal to that of the output gear 56, there is no reduction in the primary 4 to 1 ratio. The worm gear 58 of feedback F can be employed to propel the worm wheel 59 and feedback gear 57 at any angular velocity slower or faster than that of the input gear 55, thereby to subtract or add to the output ratio of output gear 66 relative to input gear 55.

In carrying out this invention, the input planet gears 65 of speed changer A are journaled on bearing trunnions 60 disposed in a circumferential series projecting inwardly from a drive flange 61 on shaft 11 inward of and seated against the carrier bearing 14. The ring gear 67 is fixedly captured in the housing of case 10 by the plate 17, there being a retainer ring 62 embracing the trunnions 60 to hold the gears 65 in place. The output gear 66 of the first stage gearing is coupled directly to and preferably integral with the input gear 55 of the second stage gearing, these two gears being concentrically journaled by a common tubular hub over shaft 11 by needle bearings 63. The output planet gears 56 of speed changer B are journaled on bearing trunnions 64 disposed in a circumferential series projecting from a drive flange 68 on tubular drive shaft 69 journaled on needle bearings 70 upon shaft 11, there being a retainer ring 71 embracing the trunnions 64 to hold the gears 55 in place. The shaft 69 extends to the exterior of the housing wall 16, being seated against carrier bearing 15 to driveably support the drive sprocket 51 at the exterior of case 10. The feedback gear 57 is then journaled over the shaft 11 and tubular shaft 69 by means of a concentric hub 72 disposed between flange 68 and the bearing 15. In practice, needle bearings are employed therebetween and an anti-friction axial thrust bearing 73 disposed against a drive gear 74 for means F projecting radially from the bearing 15 used as a positioning stop therefor. As will be apparent from the drawings, the aforementioned transmission elements are assembled into case 10 from the ends thereof and captured in working position by the plate 17 and a snap ring 75 respectively.

ROTATIONAL FEEDBACK

In accordance with this invention, the variable speed feedback means F is provided to govern the angular velocity of the controlling feedback gear 57. As shown, the gear 57 is integral with the worm wheel 59, and the means F governs the angular velocity of worm gear 58 that is constantly meshed therewith. In practice, I employ a high velocity variable speed drive driven by the output velocity of the second stage gearing B and driving the worm wheel 59 through worm gear 58. Various types of variable speed drives can be employed, the most practical of which is a frictional drive as shown. Accordingly, the feedback means F involves drive cone 75, a driving cone 76, a belt 77 operable therebetween, and a positioning means 78 for operational placement of said belt. The drive cone 75 is driven by drive gear 74, while the driving cone 76 drives the worm wheel 59.

The housing 19 of the transmission case 10 is provided with one or more openings to pass the drive and driving elements of the drive cone 75 and driving cone 76, said cones being journaled on spaced and parallel shafts 80 and 81 extending laterally of the case in a plane normal to the housing of said case. The shafts 80 and 81 are carried by anti-friction ball bearings to extend between the side wall of the housing 19 and a header 82 spaced therefrom by a post 83 disposed intermediate the two cones. A drive gear 74 is fixed to drive shaft 80 within the housing 19 and is a bevel gear constantly meshed with the gear 74, to have a speed increase of 1 to 5. A driving gear 84 is fixed to driving shaft 81 within the housing 19 and turns a feedback shaft 85 through a speed increasing gear 86. Although the driving of worm gear 58 can be direct from driving shaft 81, a speed increase of 1 to 2 is desired in the embodiment shown, wherein the worm to wheel ratio is 20 to 1 (a non-reversible ratio).

Referring now to the variable function of the cones 75 and 76, they are inversely tapered cones between which the belt 77 frictionally transmits angular velocity dependent upon the radius of engagement. Assuming the engaged radii of the two cones to be the same, the belt 77 will transmit equal angular velocity through both. However, as the engaged radius of one is increased and the other decreased, the angular velocity of the latter is increased relative to the former, and vice versa. In the embodiment shown, the drive cone is larger than the driving cone, proportioned to operate the latter between a speed reduction of 1½ to 1 to a speed increase of 1 to 2. The positioning means 78 for operational placement of the belt 77 is shown as a fork 87 embracing the drive cone and having spaced fingers 88 projecting inwardly from each leg of the fork to guide the oppositely running portions of the belt. Fork 87 is pivoted at its top end, so that its free swinging ends move between the two cones. In practice, a return spring 89 retracts the free end of the fork toward the speed increasing ends of the cones while a pull cable 90 extending to the control means C is fixed thereto to draw the free ends of the fork toward the speed decreasing ends of the cones. The cover 18 attached to post 83 encloses the feedback means F and supports the anchor and guide 92 for the pull cable 90. It will be seen that the angular velocity of the feedback shaft 85 varies infinitely according to placement of the belt 77 by frictionally engaging the inversely tapered cones.

BRAKE-TRANSMISSION CONTROL

Referring now to the control means C for applying the brakes and for conditioning the ratio determining element of the transmission feedback means F, the control means C is a handle 100 that is manually operable to simultaneously actuate the brakes and condition the transmission; being compressible to effect the former and rotatable to effect the latter. The handle 100 is carried by the handle bar 32 to depend from the conventional grip portion 101 of said handle bar, there being a base 102 attached to the grip by a clamp 103 so as to project laterally of and preferably forwardly from the handle bar and its conventional (race) configuration; downwardly and rearwardly turned. A feature of the control means is the swivel 104 disposed on the laterally extended axis of the base and to which the handle 100 is pivoted by a transverse pin 105. The handle 100 is a first class lever having a pull pin 106 spaced from pivot pin 105 and to which the actuation cable 50 of brake Z is affixed for movement through a sheath seated in the swivel; the usual manner of pulling such a brake cable. The swivel 104 is rotatably captured to the base 102 by a center shaft 107, there being a friction washer 108 disposed between the swivel and base, and a spring washer 109 cpatured by a nut so as to apply pressure thereto. It will be observed that the base 102 and swivel 104 are tubular and telescopically related for rotatable stability, there being a tangential opening 110 through the base with a seat for the sheath of pull cable 90. Accordingly, there is a peripheral channel 111 in the swivel 104, and aligned with the opening 110, to accommodate the pull cable 90 as it extends to an anchor point within the swivel. Thus, the swivel draws in the cable as it is turned counter clockwise (as shown) and lets out the cable as it is turned clockwise, the former to increase speed of the feedback means F and the latter to decrease the same. It will be seen that independent control of the brakes and transmission Y is effected with the control means C, while the bicycle rider has but the one control member to be concerned with, and such that the braking function is ever present when the gear ratio changes are to be made.

Having described only a typical preferred form and application of my invention, I do not wish to be limited or restricted to the specific details herein set forth, but wish to reserve to myself any modifications or variations that may appear to those skilled in the art.

I claim:

1. A low velocity high torque infinitely variable speed constant mesh transmission for bicycles and the like, including; a case with a crank shaft extending therethrough and with its opposite ends projecting from the case, a first stage speed changer comprising, a stationary ring gear and an input planet gear journaled on a carrier driven by the crank shaft and in constant mesh with said ring gear, and an output sun gear in constant mesh with said planet gear to be driven at increased angular velocity thereby; and a second stage speed changer comprising, an input sun gear driven by the first stage sun gear and a planet gear journaled on an output carrier rotatable over the crank shaft and in constant mesh with said second stage sun gear, and a rotatable ring gear in constant mesh with said planet gear; and an infinitely variable speed feedback drive means driven by the output carrier of the second stage and controlling the angular velocity of the rotatable second stage ring gear to effect a commensurate velocity change between the crank shaft and the output carrier.

2. The two-stage infinitely variable speed constant mesh transmission as set forth in claim 1 wherein the feedback drive means is a non-reversible gear engagement with the second stage ring gear.

3. The two-stage infinitely variable speed constant mesh transmission as set forth in claim 1, wherein the infinitely variable feedback is a high velocity drive rotating the second stage ring gear to reduce velocity in said second stage speed changer.

4. The two-stage infinitely variable speed constant mesh transmission as set forth in claim 1, wherein the infinitely variable feedback comprises inversely tapered cones with an axially positioned belt engaged therebetween, one cone driven by the output carrier of the second stage speed changer and the other cone driving the rotatable ring gear of the second stage speed changer.

5. The two-stage infinitely variable speed constant mesh transmission as set forth in claim 1, wherein the infinitely variable feedback comprises inversely tapered cones with an axially positioned belt engaged therebetween, one cone driven by the output carrier of the second stage speed changer and the other cone driving the rotatable ring gear of the second stage speed changer through a non-reversible worm and wheel drive.

6. The two-stage infinitely variable speed constant mesh transmission as set forth in claim 1, wherein the case has spaced end walls with carrier bearings through which the crank shaft projects with oppositely exposed ends.

7. The two-stage infinitely variable speed constant mesh transmission as set forth in claim 1, wherein the case has spaced end walls with carrier bearings through which the crank shaft and second stage carrier extend outside the case with the opposite ends of the crank shaft driveably exposed.

8. The two-stage infinitely variable speed constant mesh transmission as set forth in claim 1, wherein the case has spaced end walls with carrier bearings through which the crank shaft and second stage carrier extend outside the case with a drive sprocket exposed on the carrier and with opposite ends of the crank shaft driveably exposed.

9. The two-stage infinitely variable speed constant mesh transmission as set forth in claim 1, wherein the infinitely variable feed comprises a right angle gear driven from the second stage carrier and on an axis parallel to feed back gearing into the second stage ring gear.

10. The two-stage infinitely variable speed constant mesh transmission as set forth in claim 1, wherein the infinitely variable feedback comprises inversely tapered cones journaled on spaced parallel axes disposed normal to the crank shaft axis, an axially positioned belt engaged between the cones, one cone driven by the output carrier of the second stage speed changer and the other cone driving the rotatable ring gear of the second stage speed changer.

11. The two-stage infinitely variable speed constant mesh transmission as set forth in claim 1, wherein the infinitely variable feedback comprises inversely tapered cones journaled on spaced parallel axes disposed normal to the crank shaft axis, an axially positioned belt engaged between the cones, one cone driven by the output carrier of the second stage speed changer and the other cone driving the rotatable ring gear of the second stage speed changer through a non-reversible worm and wheel drive.

* * * * *